No. 871,901. PATENTED NOV. 26, 1907.
J. G. WALTON.
STAND FOR PROPPING PLANTS.
APPLICATION FILED MAR. 30, 1907.

Inventor
J. G. Walton

Witnesses

By
Attorneys

UNITED STATES PATENT OFFICE.

JOHN G. WALTON, OF COLEMAN, MICHIGAN.

STAND FOR PROPPING PLANTS.

No. 871,901.     Specification of Letters Patent.     Patented Nov. 26, 1907.

Application filed March 30, 1907. Serial No. 365,561.

*To all whom it may concern:*

Be it known that I, JOHN G. WALTON, citizen of the United States, residing at Coleman, in the county of Midland and State of Michigan, have invented certain new and useful Improvements in Stands for Propping Plants, of which the following is a specification.

The object of the present invention is to provide a novel form of stand or support for use in connection with tomato plants and the like, the said stand being designed to be applied to the plant at that stage of its growth when the fruit begins to form and to form a support for the branches which prevents the fruit from sagging and coming into contact with the ground where it would rot, and holds the same in an elevated position where it ripens in a uniform manner.

A further object is to so form the stand that it can be readily applied to the plant at the required stage in its growth, and so that it can be readily formed from the ordinary forms of spring wire.

Figure 1:
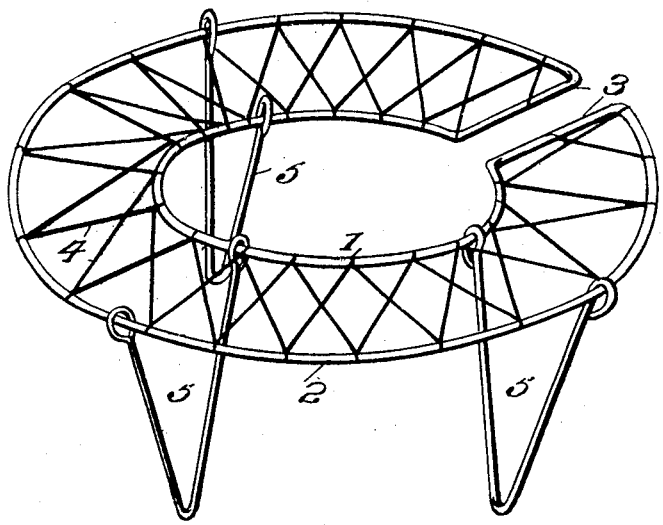
Figure 2:

For a full description of the invention and the merits thereof reference is to be had to the following description and accompanying drawings, in which:

Figure 1 is a perspective view of the improved stand. Fig. 2 is a similar view showing the application of the invention.

Corresponding and like parts are referred to in the following description and indicated in all the views of the drawings by the same reference characters.

The body portion of the stand comprises a pair of spaced and concentric rings 1 and 2 having corresponding portions of their periphery formed with breaks, and the said broken portions of the two rings are connected by the radial or transverse rods 3. In the preferred embodiment of the invention the two concentric rings and the rods 3 connecting the peripheral breaks in the same are formed from a single piece of heavy spring wire. The spaced rings 1 and 2 are connected by the netting 4 which is shown as formed of intersecting diagonal cross wires, and which effectively supports the branches of the plant and at the same time permits a free circulation of air around the same. A series of legs or supports are employed to hold the body portion of the stand in a raised position, and these legs as indicated at 5 preferably comprise approximately V-shaped pieces of wire having the free ends thereof formed with the eyes 6 loosely receiving the concentric rings 1 and 2. These supporting legs 5 are shown as three in number and are designed to fold against the body portion of the stand when the device is not in use.

In applying the support or stand to a plant, the body portion thereof is sprung apart to enable the stalk of the plant to pass through the break in the periphery of the table and when the pressure is released the table again springs back into normal position. The legs 5 are then forced partly into the ground and the table thereby securely held in an elevated position around the stalk of the plant in such a position as to form a support for the various branches of the plant.

Having thus described the invention, what is claimed as new is:

1. A stand for propping plants comprising a pair of spaced and concentric rings having breaks formed in their peripheries at corresponding points the broken portions being joined by transverse rods, connecting means between the concentric rings, and a series of legs applied to the concentric rings.

2. A stand for propping plants comprising a pair of spaced rings, connecting means between the rings, and a series of V-shaped legs, the upper ends of the legs being formed with eyes loosely receiving the said concentric rings.

3. A stand for propping plants comprising a pair of spaced and concentric rings having breaks formed at corresponding points in their peripheries the broken portions being connected by transverse rods, netting connecting the concentric rings, and a series of V-shaped legs, the two arms of each of the legs being provided with eyes loosely receiving the respective concentric rings.

4. A stand for propping plants comprising a pair of spaced and concentric rings having breaks formed in their peripheries at corresponding points, connecting means between the concentric rings, and a series of legs applied to the concentric rings.

In testimony whereof I affix my signature in presence of two witnesses.

JOHN G. WALTON. [L. S.]

Witnesses:
   P. T. HERWIG,
   I. B. WEINBURG.